June 7, 1927.
A. J. KRAUSE
1,631,739
SPEED REDUCTION MECHANISM
Filed Aug. 8, 1924
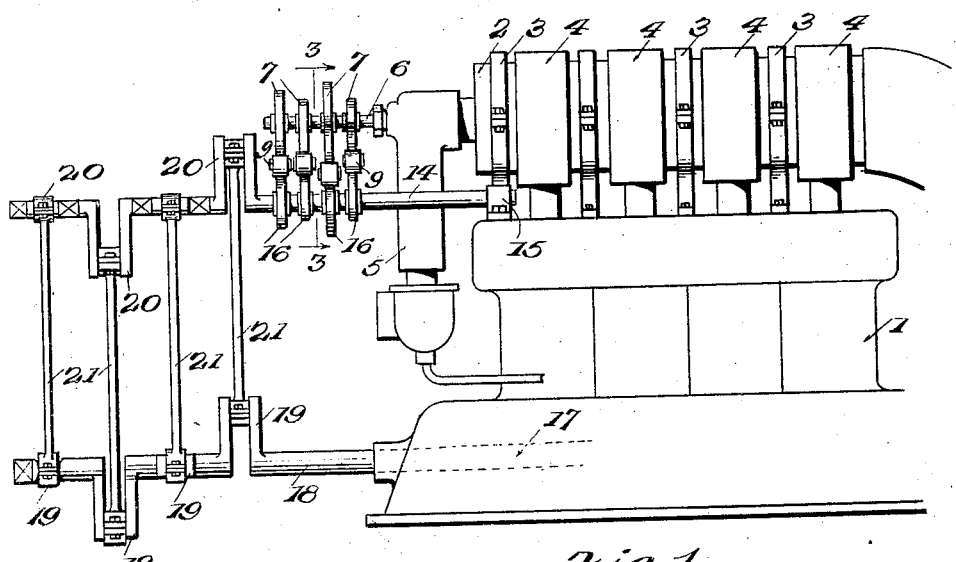
Fig. 1.
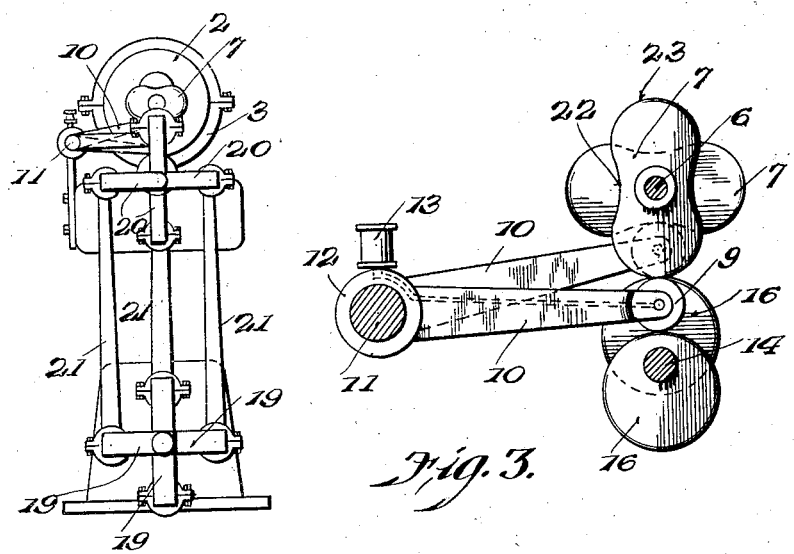
Fig. 2.
Fig. 3.
WITNESSES
Chr. Nielsen
INVENTOR
Arthur J. Krause,
BY Munn & Co
ATTORNEYS Patented June 7, 1927.

1,631,739

UNITED STATES PATENT OFFICE.

ARTHUR JOSEPH KRAUSE, OF CLEVELAND, OHIO.

SPEED-REDUCTION MECHANISM.

Application filed August 8, 1924. Serial No. 730,957.

This invention relates to internal combustion engines and is more particularly directed to a speed reducing mechanism interposed between the main crank shaft and a counter shaft which controls the operation of the rotary valve.

An object of the invention is the provision of a plurality of crank and connecting rods interposed between the main crank shaft and the counter shaft which controls the operation of a rotary valve for the engine, whereby the counter shaft will be noiselessly actuated and all vibration will be eliminated.

A further object of the invention is the provision of a plurality of cooperating cams of different designs interposed between a counter shaft and the shaft for controlling a rotary valve for transmitting motion from the counter shaft to the valve shaft whereby a reduction of speed is had between the counter shaft and valve shaft.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claim.

In the drawings:

Figure 1 is a side elevation of an internal combustion engine showing my invention applied thereto for transmitting motion from the crank shaft through the valve shaft at a reduced speed.

Figure 2 is an end view of the machine shown in Figure 1.

Figure 3 is an enlarged detail showing an end view of the cooperating cams for reducing speed.

Referring more particularly to the drawings, 1 designates an internal combustion engine having a rotary valve 2 mounted in bearing 3 and embraced by individual water jackets 4 and which is described and claimed in my Patent No. 1,540,941, granted June 9, 1925. The rotary valve is connected with an intake pipe 5 through the outer end of which extends a valve or counter shaft 6. This shaft carries a plurality of cam members 7 each of which engages a roller 9 carried by an arm 10 pivoted upon a rod 11 which is connected in any approved manner to the engine casing. The sleeve 12 at the end of the reciprocating member 10 and where located upon the shaft 11 is provided with a grease cup 13. A counter shaft 14 is mounted in a bearing 15 carried by the engine casing and other bearings carried by standards in any approved manner or brackets projected from the engine casing.

Mounted upon the shaft 14 and in alinement with a roller 9 and a cam member 7 is an eccentric cam 16, there being one cam member for each of the cam members 7 and while not being limited to such a construction I desire to provide a set of cam members for each cylinder of the engine and also a set of co-operating cranks on the crank shaft 17 and the counter shaft 14, the number of sets being equal to the number of engine cylinders comprising the internal combustion engine unit.

The crank shaft 17 is provided with an extension 18 which has a plurality of spaced cranks 19. Each crank is connected with an alined crank 20 on the counter shaft 14 and a pitman 21 connects a pair of cranks 19 and 20 for simultaneous operation.

The cam members 7 are in the shape of an ellipse with the opposite side edges, as shown at 22, being cut away to form depressions so that when the roller 9 travels over the portion 22 the shaft 6 will remain substantially in an idle position, said shaft being revolved uniformly when travelling over the circular portion 23 located at the opposite ends of the cam member 7 and at the end of the major axis of the elliptical part.

It will be seen by such arrangement in which the counter shaft 14 is connected to the crank shaft 17 by means of pairs of cranks 19 and 20 and the pitman 21, that the actuation of shaft 14 will be uniform and without vibration thereby providing a noiseless operating mechanism for the cam shaft 6.

As has been explained the operation of the elliptical cam shaped member 7 provides for variations in the speed of the shaft 6 and therefore variations in the speed of the rotary valve 2.

What I claim is:

A speed reduction device comprising a counter shaft, a valve shaft spaced from the counter shaft and provided with a plurality of angularly arranged members fixed to said valve shaft, a plurality of cams angularly arranged and fixed on the counter shaft, rock arms having rollers at the free ends, said rollers being operatively disposed between the cams and the angularly arranged members, said members on the valve shaft comprising elongated members having their opposite ends curved on the arc of a semicircle with the sides of said elongated members being provided with depressions, said cams adapted to be actuated when the counter shaft is rotated for causing actuation of the angularly arranged members and through the cooperation of the rollers on the free ends of the arms.

ARTHUR JOSEPH KRAUSE.